Nov. 29, 1932.  E. H. FRENCH  1,889,405
PROCESS FOR PRODUCING WATER SOLUBLE RESINATES
Filed March 4, 1927
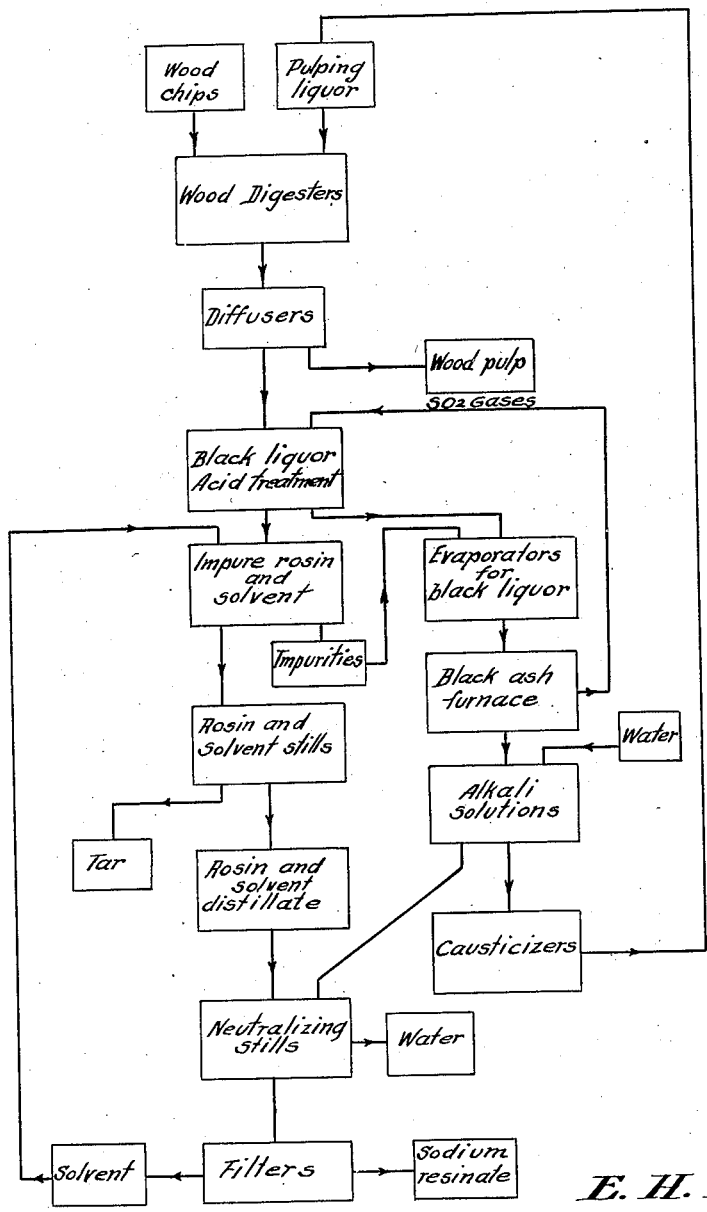
Inventor
E. H. French
By W. S. McDowell.
Attorney Patented Nov. 29, 1932

1,889,405

UNITED STATES PATENT OFFICE

EDWARD H. FRENCH, OF COLUMBUS, OHIO

PROCESS FOR PRODUCING WATER-SOLUBLE RESINATES

Application filed March 4, 1927. Serial No. 172,821.

In the manufacture of paper pulp produced from resinous woods by the so called "sulphate" process, the wood is cleaned and chipped, placed in a digester where it is treated with a solution containing sodium sulphide ($Na_2S$) and caustic soda (NaOH), the wood being cooked in this liquor with steam under pressure for a period of several hours. The turpentine of the mass is recovered by distillation and the digester "blown", the pulp separated from the pulping liquor (sometimes called "black liquor") which is evaporated to a thin paste and burned in a furnace for the purpose of consuming the organic matter and converting the sulphates formed into sulphides and carbonates.

During the described operation, the pulping or black liquor referred to, acquires a large quantity of resin and resin oils in the form of sodium resinate resulting from the combination of the caustic soda with the resins such as the abietic acid (rosin) of the wood.

Many attempts have been made to recover these sodium resinates but, as far as I am aware, without commercially satisfactory results. Among such attempts may be instanced (1) the cooling of the liquor thereby separating a portion of the sodium resinate and (2) the precipitating or "salting out" of the resinate by the addition of alkali or other suitable compound, but by such methods the quantity obtained is comparatively small and the quality and color of the resinate is so poor that it has little or no commercial value.

In the plants operating on resinous woods for the manufacture of wood pulp, the resin contained in the black liquor has only a fuel value in the black ash furnace, used to decompose the sodium salts into sodium carbonate and sodium sulphide.

The object of my invention is then an improved and economical method of recovering the resinous content from alkaline liquors, especially those resulting from the manufacture of pulp by the sulphate or soda processes, in a form and a quality equaling, if not superior to, that obtained directly from the crude resin gum.

My invention is particularly productive in treating the alkaline liquor obtained from the stumpage of long leaf yellow pine, which contains 400 to 700 pounds of rosin to the cord, but its employment is profitable in the treatment of liquors obtained from the pulping of woods having a smaller resinous content.

The drawing is a diagrammatic view showing the steps of my process.

The chemical formula of the rosin (abietic or sylvic acid) is given by some investigators as $C_{20}H_{30}O_2$ and by others as $C_{19}H_{28}O_2$ thus signifying a molecular weight of approximately 302 and 288 respectively.

In the sulphate process of manufacturing pulp, the alkali employed is usually derived from "salt cake" (impure sodium sulphate, $Na_2SO_4$) which, after passing through the furnaces described in the presence of organic matter, is changed into sodium carbonate and sodium sulphide as before indicated. Therefore assuming, as an example, that the rosin content of a cord of wood is around 500 pounds, there will be required about 100 to 125 pounds of salt cake to produce an amount of alkali, sodium carbonate or sulphide necessary to neutralize the abietic acid content of the resinous matter of such wood. The sodium resinate contained in the black, or spent pulp liquor is in solution in the liquor when the liquor is hot, and partially when cooled.

During the pulping reaction in the sulphate process, the sulphur of the sodium sulphide, according to Klason, is released from the sodium as the latter becomes available as an active alkali and the sulphur may be accounted for approximately in the following manner:

| | Per cent |
|---|---|
| Engaged by the lignin | 51.8 |
| Engaged by volatile organic substances | 15 |
| Engaged as $Na_2S$ | 15.8 |
| Engaged as sulphates | 17.4 |
| | 100.0 |

In the black ash furnace, above mentioned, which is used for the purpose of converting the sodium sulphate into sodium sulphide and sodium carbonate, the reaction taking place forms sulphur dioxid which goes into the atmosphere as an objectionable fume. In most pulp mills the heat of these furnace gases is first utilized in evaporators before the fumes pass into the atmosphere.

I have discovered that the sodium resinate of the black liquor may be decomposed into rosin and sodium sulphite without substantially decomposing the remaining sodium salts of the black liquor, thereby maintaining the black liquor alkaline or neutral. This discovery is valuable because it permits of the recovery of the rosin without disturbing the condition of the black liquor so much as to require changes in existing plant methods of recovery of its sodium salts. One preferred method of accomplishing this result is by passing the sulphur dioxid containing fumes from the black ash furnace, or sulphur dioxide itself, or the like through the black liquor containing the sodium resinate until the precipitation of substantial amounts of rosin ceases, but not for a period sufficiently long to acidify the black liquor, the rosin being instantly released, and in the presence of the gases which is occludes, the specific gravity of the released rosin is lessened causing it to rise to the surface where it can be readily removed. This decomposition and separation I accomplish under the same principle by adding a dilute acid such as dilute (20%) sulphuric acid or hydrochloric acid, slowly while coincidently passing air or gas through the liquor, preferably by spraying the materials. In each case such of the released rosin from the residual resinate solution separation is possibly dependent upon fine division of the reagents and the occlusion of the gas by the rosin. Nitre cake in dilute water solution can be used and obviously increases the sodium content of the liquor in the form of sodium sulphate, thereby simultaneously securing the double result of releasing the rosin and obtaining sodium sulphate at a low cost. The amount of acid to be used is determined by analyzing the liquor for its rosin content by standard methods of analysis.

It is well known that 35% to 40% of the rosin used in this country enters into the manufacture of soap, and that for this purpose the rosin acids are mixed with soda ash or caustic soda for saponification. In this manufacture usually only the lighter shades of rosin are used, such as N, M, WG, and WW grades although some K grade is used. It is also well known that a like percentage of rosin is used in the manufacture of paper size, although in this manufacture the lower grades or rosin are used, the average grade being F grade. In this latter manufacture the rosin is treated with soda ash and water, but the amount of soda ash added is less than the theoretical amount that would be needed for complete neutralization, so that the finished material contains from 15% to 50% of free rosin. Thus 70% to 80% of the rosin used in this country is mixed with an alkali, but none so far as I am aware is marketed as a neutral resinate.

It is very difficult to neutralize rosin exactly by the addition of an alkali. The boiling of the rosin with an alkali under atmospheric pressure will only completely neutralize it after prolonged heating. However, such heating of the rosin causes an increase in the color of the finished product and is thus objectionable. The reasons for this are that since rosin is a solid at normal temperatures it must be heated to around 120–150° C. in order to melt it and put it in the proper physical condition for the resinate-forming reaction. Thereafter a prolonged mixing of the melted rosin and the aqueous alkaline solution is required, usually in a closed vessel under pressure, to secure the proper intimate contact between the reacting materials and insure completeness of reaction, especially since soda ash is soluble in water but not in rosin, while rosin is insoluble in water. I have discovered that a mixture of rosin with an alkali, water and a solvent such as kerosene, gasoline, turpentine, gas oil etc. will form a clear solution if mixed in suitable proportions. For example, a preferred procedure in forming the resinate comprises dissolving one hundred parts of rosin having an acid number of 162 in from 100 to 200 parts of kerosene, to which is thereafter added an aqueous solution of soda ash in amount sufficient to neutralize the major portion of the rosin present, and preferably from 50% to 80% thereof. The soda ash solution may be a saturated solution, or it may be a somewhat more dilute solution, but when more than one part of water to two parts of rosin is employed an undesirable emulsion will be formed. The mixture above set out produces a clear solution thus permitting the necessary intimate contacting of the reacting substances not obtainable when rosin and alkali are directly mixed together. If a greater proportion of water than that recited here is used, an emulsion is formed. It is preferable to use the proper amount of water to form a clear solution. However, in any event, the removal of water by distillation results in a breaking of the emulsion or solution into its components, additional solvent being used if necessary to accomplish this separation.

This second or neutralizing step in my process is dependent upon the quality of material demanded. If a good commercial grade of sodium resinate or a paper size is desired, the crude rosin mentioned above is dissolved in a water-insoluble organic rosin solvent such as kerosene, gasoline, turpentine, gas oil or other suitable solvent and the solvent layer which forms is separated from the water layer which contains impurities not soluble in the solvent. One part of rosin to two or three parts of kerosene gives satisfactory results, though these proportions may be varied considerably. To the solution of rosin, I now add sufficient soda ash, caustic soda or other suitable alkali to neutralize the greater portion of the rosin acid, say 80% thereof, present, but not sufficient to neutralize all of the rosin acid present and sufficient water to cause the whole mixture to form a clear solution. The water is advantageously added with the alkali in the form of an aqueous solution of the latter to the solution of rosin in kerosene. This mixture is then distilled until the added water has been vaporized when the temperature of the mixture rises and the reaction progresses rapidly, the water formed in the reaction distilling over at about 270 degrees F. The water of reaction is removed as formed, and at the point where most of the water has been distilled off, the sodium resinate begins to crystallize out of the solution,—the ratio of solvent to resinate being maintained as above set out and a diminution of the solvent avoided during the distillation or the amount distilled away being replaced. If the dilution of the mixture is materially below that of 1 part of solvent to 1 part of rosin or its equivalent of sodium resinate, and if all of the water is not distilled away, the entire mass upon cooling becomes a stiff jelly and is not then adapted for the removal of the resinate therefrom. When a large excess of the solvent has been used, as where the said solution contains for example, 8 parts of kerosene to each part of the total resin-resinate, obviously it is possible to distill off some of the solvent without the necessity of replacing the portion in excess of that required for facilitating the crystallization of a neutral, water-soluble resinate in granular form, and for retaining the resin and coloring matter in solution during the said crystallization.

The precipitate is next filtered from the kerosene solution of rosin and washed with an additional amount of solvent, preferably a light fraction of petroleum such as petroleum naphtha. The resultant product is a good quality of resinate.

When a very high quality of resinate is demanded, I distill the rosin removed from the first step of the process under a reduced pressure, which when carried out in glass apparatus with about 4 cm. pressure causes practically no decomposition of the rosin into hydrocarbons, such as colophene or abietene or the like, but when distilled in iron stills, it is difficult to prevent partial decomposition. Also, it is very difficult to distill rosin even in stills of as much as 20 barrels capacity because of the frothing of the rosin. This objectionable characteristic I have found can be prevented by passing the vapor of a hydrocarbon liquid such as kerosene through the liquid in the still during distillation, or preferably by atomizing the material into the still with such a vapor. These distillation procedures change the surface tension of the material as well as its vapor pressure. Distillation as thus described furnishes a very pure rosin. This product is treated as before described for the recovery of the rosin in the form of resinates, and produces an almost chemically pure product. The residue from this distillation is tar.

The features then of my process may be summarized as follows:

1. Fractionally separating the rosin from an alkaline solution by acidification in the presence of a gas.
2. Dissolving the rosin in a solvent and removing the undissolved water and impurities therefrom.
3. Distilling under reduced pressure.
4. Changing the surface tension and vapor pressure by the addition of an inert vapor during distillation.
5. Forming a solution of the dissolved rosin with an alkali.
6. Distilling off the water content and precipitating the sodium resinate from the solution.
7. Filtering and washing the sodium resinate from the occluded solvent.

This application is a continuation in part of my prior application for U. S. Letters Patent, Serial #50,526, filed August 15, 1925.

What is claimed is:

1. The process of producing a water soluble resinate from rosin which comprises dissolving the rosin in a water-insoluble volatile solvent, adding sufficient of an alkaline alkali metal compound to neutralize at least the major portion of the rosin in the presence of water in amounts insufficient to cause the formation of an emulsion, distilling off the water present while replacing any solvent distilling off therewith, and separating from the remaining liquid the resinate thus precipitated.

2. The process as defined in claim 1 in which the said solvent employed comprises a mixture of hydrocarbons.

3. The process of producing a water-soluble resinate from rosin which comprises dissolving the rosin in a water-insoluble volatile solvent, adding sufficient of an alkaline alkali metal compound to neutralize at least the major portion of the rosin in the presence of water insufficient to cause the formation of an emulsion, distilling off the water while replacing any solvent distilling off therewith, whereby the resinate is precipitated, cooling the mixture, and separating the precipitated resinate from the remaining liquid.

4. The process as defined in claim 3, including the step of washing the separated resinate with a water-insoluble volatile solvent in amounts sufficient to remove therefrom any mother liquor containing rosin, coloring matter and other impurities.

5. The process of producing a resinate from rosin which comprises dissolving the rosin in a volatile water-insoluble solvent, adding sufficient of an alkaline compound of the alkali metal group in aqueous solution to neutralize at least the major portion of the rosin, sufficient water being present to form with these substances a clear solution, distilling off the water while replacing any solvent distilling off therewith, and separating the precipitated resinate from the remaining liquid.

6. The process of producing a resinate from rosin which comprises dissolving the rosin in a volatile water-insoluble solvent having a boiling point higher than that of water, adding sufficient of an alkaline alkali metal compound in aqueous solution to neutralize at least the major portion of the rosin, sufficient water being present to form with these substances a clear solution, distilling off the water while maintaining in the clear solution a ratio of solvent to total resin-resinate content of not less than 1:1, and separating the thus precipitated resinate from the remaining liquid.

7. The process as defined in claim 6 in which sufficient of the alkaline compound is employed to neutralize about 80% of the rosin present in the volatile solvent solution thereof.

8. The process as defined in claim 6 in which the rosin solvent is employed in excess of the amount of rosin present.

9. In the process of producing high-grade resinates from alkaline liquors containing crude resinates derived from rosin, according to which process an acid gas is passed through the said liquors to precipitate therefrom a mixture of resins, resinates, and impurities, the said precipitate is separated from the liquors, a water-insoluble volatile solvent is added to the latter in amounts sufficient to dissolve the resins, and the resultant solution is separated from the matter insoluble in the said solvent, the steps which comprise adding to the said solution alkaline alkali metal compound in amount sufficient to neutralize at least the major portion of the resins and in the presence of sufficient water to form with these substances a clear solution, distilling off the water present and that formed in the reaction while maintaining in the clear solution a ratio of solvent to total resin-resinate content of not less than 1:1, and finally separating the thus precipitated resinate from the remaining liquid.

10. In the process of recovering a substantially neutral resinate from the alkaline liquor produced in the alkaline treatment of resinous wood during the pulping thereof, according to which process the liquor is treated with an acid substance in fluid form to precipitate therefrom a mixture of resins, resinates and impurities, the said precipitate is separated from the liquor, and the former is dissolved in a water-insoluble volatile solvent, and the resultant solution has separated therefrom the matter insoluble therein, the steps which comprise treating the said solution with an alkaline alkali metal compound in amount sufficient to neutralize at least the major portion of the resins, in the presence of sufficient water to form with these substances a clear solution, distilling off the water while maintaining in the clear solution a ratio of solvent to total resin-resinate content of not less than 1:1, and separating the resultant precipitated resinate from the remaining liquid.

11. The process as defined in claim 10 in which the fluid acid substance employed comprises sulphur dioxide gas.

12. In the process of recovering a high-grade resinate from the alkaline liquors containing resinates produced in the manufacture of wood pulp by alkaline pulping methods according to which recovery process impure resins are precipitated from the said liquors by means of a fluid acid substance, and after separation from the liquors are dissolved in a water-insoluble volatile solvent, the resultant solution distilled under vacuum in the presence of a stream of the said solvent vapors, and the mixed vapors are then condensed, the steps which comprise treating the resultant distillate with an alkaline alkali metal compound and water in amounts sufficient to form a clear solution with these substances but insufficient to completely neutralize the resins, distilling off the water, and separating the precipitated resinate thus formed from the residual liquid.

13. The process as defined in claim 12 in which the fluid acid substance comprises the sulphur-dioxide containing gases from the black ash furnace.

14. In the process of producing a highly purified resinate from alkaline liquors containing resinates such as are produced in the manufacture of wood pulp by alkaline pulping processes, according to which impure resins in the said liquor are precipitated by acid treatment of the resinates while passing a gas through the liquor, and in which the impure resins, after separation from the liquor, are dissolved in a water-insoluble resin solvent having a boiling point above that of water and the resultant solution is distilled in vacuum in the presence of vapors of the said solvent, and the mixed vapors are then condensed, the steps which comprise treating the resultant distillate with an alkaline alkali metal compound and water in amounts sufficient to produce a clear solution but insufficient to neutralize more than 80% of the said resins, distilling off the water and crystallizing from the solution in granular form a substantially neutral resinate while maintaining in the solution a ratio of solvent to total resin-resinate content of not less than 1:1, separating the resinate from the resin solution and washing it with a water-insoluble resin solvent.

15. The process of producing a water soluble resinate from rosin which comprises dissolving the rosin in a water-insoluble organic solvent, adding to the solution water and a water soluble inorganic base, the latter being present in amount sufficient to neutralize from 50% to 80% of the rosin, distilling off water while maintaining the solvent present in amount sufficient to facilitate crystallization of the resinate from the solution, and separating the thus crystallized resinate from the said solution.

16. The process as defined in claim 15 in which the solvent employed is kerosene.

17. The process of producing a water soluble resinate from rosin which comprises dissolving the rosin in a water insoluble organic solvent, adding to the solution water and a water soluble inorganic base, the latter being present in amount sufficient to neutralize from 50% to 80% of the rosin, distilling off water under conditions adapted to prevent such diminution of the solvent as would prevent crystallization from the mixture of the resinate thus formed, and then separating the crystallized resinate from the residual liquid.

18. In the process of producing a highly purified resinate from alkaline pulping liquors containing compounds of rosin, according to which process impure rosin is precipitated from the liquors by acid treatment of the latter while passing a gas therethrough, the impure rosin, after being separated from the liquor, is dissolved in a water-insoluble rosin solvent having a boiling point above that of water, the resultant solution being then distilled in vacuum in the presence of vapors of the said solvent, and the mixed vapors condensed, the steps which comprise treating the resultant distillate with water and an alkaline alkali metal compound, the latter being present in amount sufficient to neutralize from 50% to 80% of the said rosin, distilling off water while maintaining the solvent present in amount sufficient to facilitate crystallization of the resinate from the solution, and separating the thus crystallized resinate from the said solution.

19. The process of producing a high-grade water soluble resinate which comprises, the steps of preparing a clear aqueous solution containing a water-insoluble resin solvent, an alkali metal resinate, and free rosin, distilling off substantially all of the water from the said solution, and crystallizing the alkali metal resinate in the presence of the remaining solution of rosin.

20. The process as defined in claim 6, according to which the rosin and the solvent are employed in the ratio of at least one part of rosin to about three parts of solvent.

21. The process of producing a water soluble resinate, which comprises treating rosin in the presence of an aqueous alkaline solution and a water-insoluble organic solvent by heat to remove water, the said organic solvent being present in amount sufficient to facilitate crystallization of the resinate, and the alkaline solution being in amount sufficient to convert at least the major portion of the rosin to resinate.

In testimony whereof I affix my signature.
EDWARD H. FRENCH.